Patented Mar. 28, 1939

2,152,071

UNITED STATES PATENT OFFICE 2,152,071

PREPARATION OF STABLE CELLULOSE ESTERS

Carl J. Malm, Rochester, N. Y., assignor to Eastman Kodak Company, Rochester, N. Y., a corporation of New Jersey No Drawing. Application June 10, 1938, Serial No. 213,025

5 Claims. (Cl. 260—227)

This invention relates to processes of preparing stable organic acid esters of cellulose in which ions that form bisulfates which are soluble in the esterification bath are avoided.

In the making of organic acid esters of cellulose, sulfuric acid is commonly employed as the catalyst. In these processes, the resulting product is ordinarily unstable due to the presence of combined sulfur therein resulting from the presence during the esterification of bisulfates which are soluble in the esterification mixture. For instance the product obtained in a process in accordance with Example I of German Patent No. 222,450 contained 14% combined sulfuric acid and was extremely unstable. This large amount of combined sulfuric acid is due to the use of large quantities of pyridine bisulfate in the esterification. Pyridine bisulfate is very soluble in the esterification mixture. Although other processes employing sulfuric acid as the catalyst may not contain so large a proportion of bisulfate-forming ions nevertheless the content of combined sulfur present therein is sufficiently large to render the ester unstable.

As cellulose esters are used for many purposes in which permanence is important such as photographic film, lacquers, yarns, laminated glass, etc. the presence of but a small proportion of combined sulfur would be sufficient to adversely affect the stability of ester and its usefulness for these purposes.

There have been many practices in esterification procedures which increased the amount of bisulfate-forming ions present. For instance in the manufacture of cellulose esters, such as cellulose acetate, sodium acetate has often been added to the reaction mixture to buffer the activity of the sulfuric acid catalyst, thus introducing bisulfate-forming ions. In the washing of cellulose after its purification and prior to its esterification it has often been the practice to soften the water used for the washing, thereby introducing alkali metal ions into the esterification mixture via the cellulose.

One object of my invention is to provide a process for making stable cellulose esters in which sulfuric acid is employed as the acylation catalyst. Other objects will appear herein.

I have found that the chemical combination of the sulfuric acid with the cellulose being esterified is prevented by excluding ions which form bisulfates that are soluble in the reaction mixture. I have found that if in an esterification process (1) the cellulose employed as the starting material is washed free of salts such as by washing in distilled water, (2) the esterification is carried out in a non-corrosive vessel and (3) the reagents employed are free from bisulfate-forming ions, a cellulose ester of good stability is obtained.

To wash the cellulose used as the starting material, such as refined cotton linters or refined wood pulp, free from bisulfate-forming ions, distilled water is employed. Usually a washing of one-half hour is sufficient although this time may vary according to conditions. For instance if an elevated temperature is used the washing time may be shortened. If desired the cellulose may be given a wash initially with very dilute acid, such as water containing a small amount of, such as approximately 1%, of sulfur dioxide, followed by a wash with distilled water. Another alternative, which may be employed, is to wash with distilled water into which carbon dioxide or a, purified if necessary, carbon dioxide-containing gas is bubbled. This lowers the pH value and thus makes more effective the removal of basic ions from the cellulose.

If the washing in which carbon dioxide is bubbled in, is used, it is preferred that the temperature be not elevated as the amount of carbon dioxide dissolved by the water will be less.

After the completion of the washing, the cellulose is freed from the water, which may be by centrifuging and then subjected to a mild heat, such as by contacting a current of hot dry air with the cellulose.

To assure against the presence of bisulfate-forming ions in the esterification mixture, the reaction should be carried out in non-corrosive equipment in which at least the lining, the stirring blades or, in fact, any part of the esterification vessel contacting with the esterification mixture should be of a non-corrosive metal, such as described in my U. S. Patent No. 1,840,404, granted January 12, 1932.

The reagents employed in the esterification mixture, such as the acetic acid, the acetic anhydride and the catalyst should be free of bisulfate-forming ions. As both metallic ions and ammonia or substituted ammonias form bisulfates, which are soluble in the esterification mixture, their presence in the esterification bath should be avoided. Some of the more common basic ions which are ordinarily present in the esterification mixture due to the washing of the cellulose, or the buffering of the catalyst are the alkali metal ions which may include sodium, potassium, lithium, magnesium and ammonium. If a vessel, which is susceptible to corrosion by the esterification mixture, is used, ions of the metal or metals affected would be present. These might be of copper, nickel, iron, cobalt, zinc or any other metal which might come into use, either per se or in an alloy, for making esterification equipment. The reagents to be used should be free of these ions or any other undesirable basic ions which might possibly be picked up under ordinary conditions in their manufacture.

The following example illustrates the efficacy of my invention:

A quantity of refined cotton linters, which had been subjected to washing with softened water in their refining, was divided into two parts and one part was washed several times with distilled water and dried with mildly-heated air. Both parts were esterified separately as follows, using reagents free of bisulfate-forming ions:

50 parts by weight of the cotton lineters were mixed with 350 parts of glacial acetic acid containing 1 part of sulfuric acid.

The mass was then cooled to 17° C. and 150 parts of acetic anhydride (85% strength) was thoroughly mixed in. The addition of anhydride causes esterification to occur, which was continued until a clear solution was obtained at a maximum temperature of 40° C. The cellulose acetate formed was hydrolyzed to acetone-solubility by adding a mixture of water, sulfuric acid and acetic acid and allowing the hydrolysis to proceed, as is well known. The hydrolyzed cellulose acetate was precipitated in dilute acetic acid, washed and dried. The pretreatment and esterification were carried out in a stainless steel vessel and the reagents, which were added, were chemically pure as far as basic ions, which would form bisulfates, are concerned.

The acetates prepared from the two samples of cotton linters were heated at 180° C. The acetate made from the linters, which had been washed in distilled water, did not show any change in color after 10 hours heating, thus showing it to be a product of good stability. The sample made from the linters, which had not been additionally washed with distilled water, melted and decomposed, showing it to be an unstable product.

The above described esterification, using linters washed with distilled water, was repeated. In the esterification proper, a small amount of sodium bisulfate was added. The resulting product was found to be very unstable.

The above example is merely exemplary of one acylation process which might be used to embody my invention. Any other acylation process might be employed, providing bisulfate-forming ions are absent. My invention pertains to acylation processes in which part or all of the acylation catalyst employed is sulfuric acid. My invention applies equally as well to processes of preparing other lower fatty acid esters of cellulose, such as cellulose acetate propionate, cellulose acetate butyrate, cellulose propionate, and cellulose butyrate.

The esters prepared in accordance with my invention are eminently suitable for use where permanence and insurance against cracking or breakage is particularly desirable, such as photographic film, lacquers, electrical insulation, etc. In many instances in these uses the cellulose ester is subjected to severe conditions, such as in Cine film which is repeatedly run through a moving picture projector during part of which course it is subjected to a high temperature. Lacquer coatings are often subjected to severe conditions such as automobile finishes in which both heat and actinic rays from the sun, which tend to cause disintegration of an unstable cellulose ester, are met with.

I claim:

1. A process for preparing a stable organic acid ester of cellulose which comprises washing the cellulose free of bisulfate-forming ions, drying the cellulose and acylating it within non-corrosive walls, with acylating reagents including a sulfuric acid catalyst in which bisulfate-forming ions which are soluble in the esterification mixture are substantially completely absent.

2. A process for preparing a stable cellulose acetate which comprises washing the cellulose free of ions which form bisulfates soluble in the esterification bath, drying the cellulose and then acetylating it in non-corrosive equipment with an esterification bath comprising acetic anhydride, acetic acid and a sulfuric acid catalyst in which esterification bath, bisulfate-forming ions which are soluble therein are substantially completely absent.

3. A process for preparing a stable organic acid ester of cellulose which comprises washing the cellulose with a very dilute aqueous acid and then with distilled water, drying the cellulose under mild drying conditions, and then acylating it in non-corrosive equipment, with acylating reagents including a sulfuric acid catalyst in which bisulate-forming ions, which are soluble in the esterification mixture, are substantially completely absent.

4. A process for preparing a stable organic acid ester of cellulose which comprises washing the cellulose with a very dilute solution of sulfur dioxide and then with distilled water, drying the cellulose under mild drying conditions, and then acylating it in non-corrosive equipment, with acylating reagents including a sulfuric acid catalyst in which bisulfate-forming ions, which are soluble in the esterification mixture, are substantially completely absent.

5. A process for preparing a stable organic acid ester of cellulose which comprises washing the cellulose with distilled water into which carbon dioxide is being introduced, drying the cellulose under mild drying conditions, and then acylating it in non-corrosive equipment, with acylating reagents including a sulfuric acid catalyst in which bisulfate-forming ions, which are soluble in the esterification mixture, are substantially completely absent.

CARL J. MALM.